Sept. 18, 1951  G. N. VRIENS ET AL  2,568,176
RECOVERY OF DINITRILE SOLVENTS
Filed Feb. 10, 1950  2 Sheets-Sheet 1

INVENTORS
GERARD N. VRIENS,
WILLIAM E. SISCO,
EUGENE C. MEDCALF,
BY
ATTORNEY

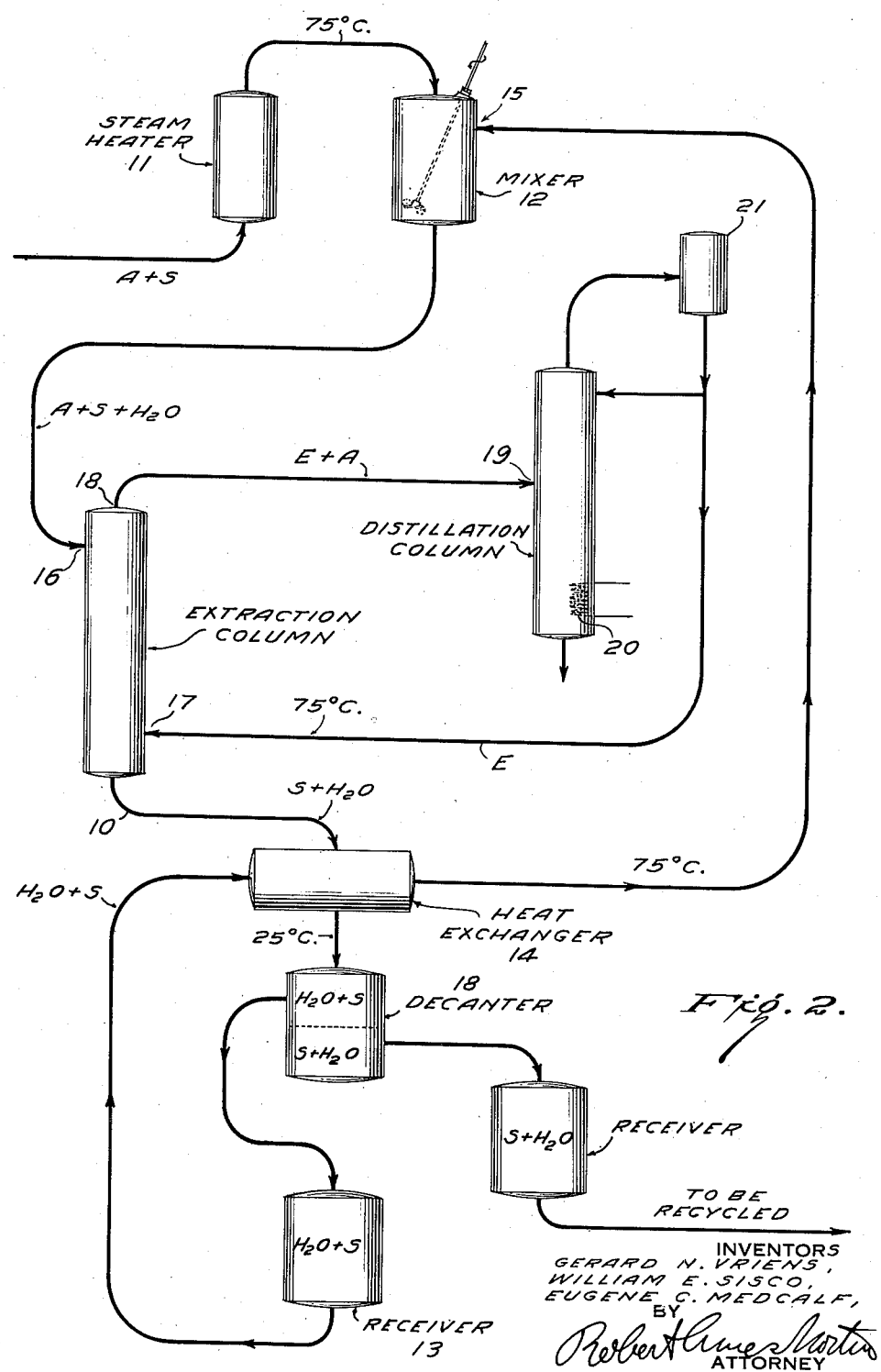

UNITED STATES PATENT OFFICE 2,568,176

RECOVERY OF DINITRILE SOLVENTS

Gerard N. Vriens and William E. Sisco, Somerville, and Eugene C. Medcalf, Bound Brook, N. J., assignors to American Cyanamid Company, New York, N. Y., a corporation of Maine Application February 10, 1950, Serial No. 143,584

18 Claims. (Cl. 260—465.6)

This invention relates to a method of removing dissolved material from dinitrile solvents.

Three types of dinitrile solvents, the dicyanoalkyl oxides, amines and sulfides, have shown remarkable selective solvent action and can be used in a number of solvent extraction processes. Among the separations of large practical interest are the extractions of aromatics, or other relatively unsaturated hydrocarbons, from paraffins in the refining of certain petroleum fractions, and the separation of alkylated aromatics having different degrees or types of alkylation, such as, for example, monoalkyl-substituted phenols and homologues from polyalkylated phenols, and N,N-dialkylaniline and its homologues from the corresponding N-alkyl nuclear alkylated isomers.

All three types of solvents decompose at elevated temperatures, decomposition reaching amounts up to 10 to 30% per hour for temperatures of 200° C. and higher. This has seriously restricted the use of these solvents in the past because it has been necessary to separate the solvent from its dissolved material by means of distillation. As the solvents are all high-boiling, this step has been accompanied by serious losses due to decomposition.

Two of the three most common solvents referred to above, namely bis-cyanoalkyl ethers and sulfides, exhibit very low solubility in water at room temperature. While they are much more soluble at higher temperatures from 70 to 100° C., bis(2-cyanoethyl) ether is miscible in all proportions with water. This steep temperature-solubility curve has made possible improved processes of separating solvent from solute by dissolving the former in hot water, separating, and recovering the solvent by cooling and decanting. This recovery process is not claimed as such in the present invention, but forms the subject matter of copending applications of Medcalf and Sisco, Serial No. 143,585 and Serial No. 143,586, filed February 10, 1950. The simple water-extraction method is not, however, effective with one of the best solvents, namely bis(2-cyanoethyl) amine, because this solvent is too soluble in water at room temperature. Also, the water-extraction method is limited to the recovery of solvents from solutes which are substantially insoluble in water at room temperature.

According to the present invention, solvent recovery is effected by extraction of the solute with an organic extractant which has little or no solvent action on the dinitrile solvent. Throughout the specification the solvent used in extracting the solute will be referred to as the "extractant" in order to avoid confusion with the dinitrile solvents which are being separated. The term "solvents" will refer to the latter exclusively. In the case of solutions of aromatic hydrocarbons, a field in which the present invention is particularly useful, a preferred extractant is a paraffin hydrocarbon having a boiling point greatly removed from that of the aromatic. For instance, in the case of naphthalene, a suitable extractant would be n-heptane or a commercial mixture of low-boiling paraffin hydrocarbons. In the case of lower-boiling aromatics, such as benzene, and toluene, it is sometimes desirable to use a high-boiling paraffin hydrocarbon, such as decane, or a petroleum fraction composed of paraffins of 9 to 12 carbon atoms. At first glance it appears that the result of the extraction process of the present invention, when applied to the recovery of aromatic hydrocarbons, would be undoing the results of the original solvent extraction with the dinitrile solvent. This, however, is not the case because the solvent was originally used in order to separate a mixture of paraffins and aromatics having related boiling points, and which form azeotropes, thus preventing satisfactory separation by fractional distillation. The preferred paraffin hydrocarbon extractants of the present invention, however, are chosen with boiling points far removed from the aromatics and are incapable of forming any considerable percentage of azeotropic mixtures therewith. Separation by fractional distillation is therefore easy.

While the paraffin hydrocarbons constitute one of the most important classes of extractants usable in the present invention, it is not limited thereto, and other extractants which show substantial solvent action for the dissolved materials, but not for the dinitriles, may be used. These products in general should have little or no water solubility at room temperatures. Examples of such other extractants are: chloroparaffins of five or more carbon atoms, cycloparaffins, ethers, such as di-amyl ether, and higher alcohols having more than twelve carbon atoms, such as lauryl alcohol. It will be noted that all of these extractants are essentially saturated, or practically saturated, hydrocarbons and derivatives in which the saturated hydrocarbon is the larger constituent of the molecule, and the substituent groups do not destroy the solvent characteristics of a saturated hydrocarbon. In every case, of course, the extractant must have the property of negligible solvent powers for the dinitrile solvent at room temperatures, or at elevated temperatures, coupled with adequate solubility at the same temperatures for the material dissolved in the dinitrile solvent. In order to avoid loss of extractant, it is also desirable that it should have little or no water solubility at room temperature. Any inert organic compound liquid at the temperatures involved, which meets the above requirements, may be used.

The present invention can be used to recover dissolved material from any of the bis(lower cyanoalkyl)amines, oxides and sulfides. Typical examples are the 2-cyanoethyl derivatives referred to above, 2- and 3-cyanopropyl derivatives, and the like. When the hydrocarbon chain becomes too long, the solubility in some of the extracting solvents, such as paraffins, becomes excessive, and the process loses too much of its economic value. The present invention is therefore practically limited to the use with solutions in the lower cyanoalkyl derivatives.

In the case of dinitrile solvents, such as with cyanoalkylethers and sulfides and certain dicyanoalkylamines, the process of the present invention can be improved in efficiency by the use of small amounts of hot water which reduce the solvent powers of the dinitrile solvent, and thus effect a sharper separation of dissolved material. The addition of water is claimed only in connection with the solvent extraction features, which are the essential characteristics of the present invention. The use of water alone is not claimed here.

The process of the present invention may be used as a batch process, but for large-scale operation considerable economies can be effected by using a continuous process with counter-current extraction. The invention will be described in greater detail in conjunction with the following specific examples and drawings, in the latter of which:

Fig. 2 is a diagrammatic flowsheet of a process using an extractant and a small amount of water.

Figure 1:
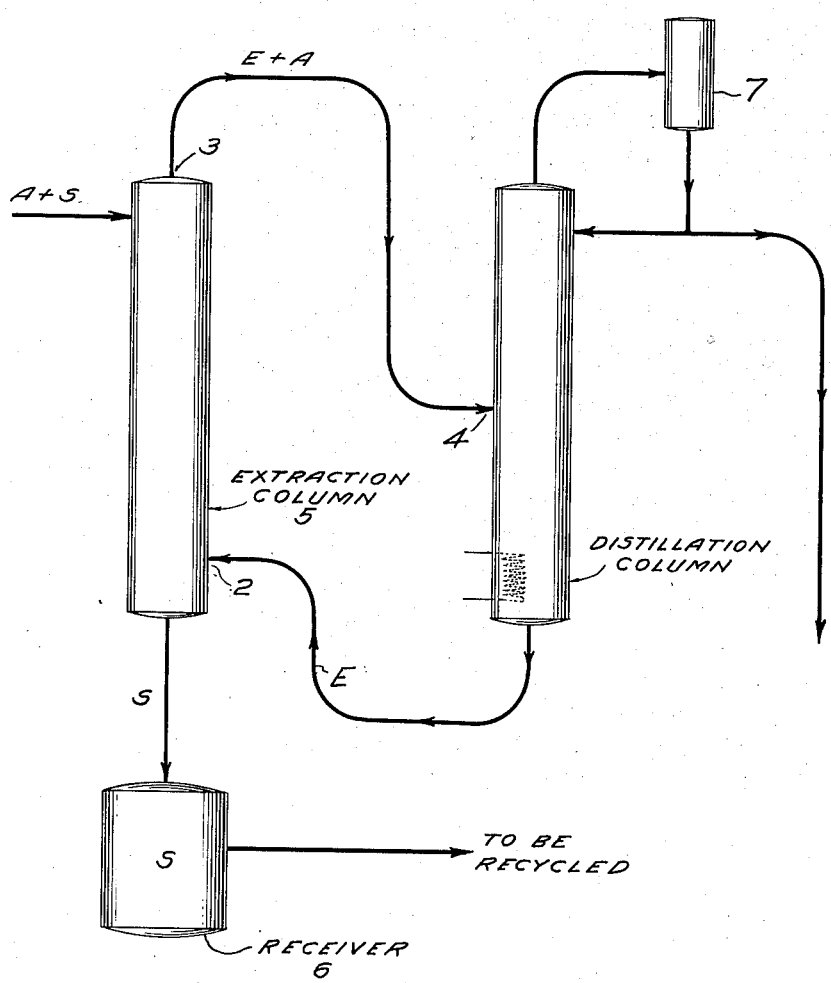
Fig. 1 is a diagrammatic flowsheet of a process using an extractant alone.

In both drawings the dissolved material, for example aromatics, is designated as A, the dinitrile solvent as S and the extractant as E.

Before considering the specific examples, a general description of the flowsheets is given as follows:

In Fig. 1 the solution in the dinitrile solvent is introduced at the top of a packed extraction column at point 1. The extractant is introduced at the bottom of the column at point 2. The dinitrile solvent leaves the bottom of the extraction column 5 and flows into a receiver 6. The solution of the solute in the extracting column leaves the top of the column at 3 and is introduced at 4 in the middle of a distillation column of conventional design. The dissolved material leaves the top of the distilling column and is condensed in a condenser 7 and recovered, a portion being permitted to reflux in accordance with standard distillation practice. The extractant leaves the bottom of the distillation column and, as described above, is recirculated to the bottom of the extraction column.

Fig. 1 is drawn to represent the situation where the dinitrile solvent has a higher specific gravity than the extractant, and the latter a higher boiling point than the material extracted. If the specific gravities are reversed, the connections to the extraction column are also reversed, and, similarly, if the extractant has a lower boiling point than the material which it extracts, the connections to the distillation column are reversed.

Fig. 2 illustrates a somewhat more elaborate system in which a small amount of water is also used. The solution of the material in the dinitrile solvent is introduced into a steam-heated heater 11, and then into a mixer 12 where it is mixed with pre-heated water containing a small amount of dinitrile solvent, the latter being introduced at point 15. The mixture is then introduced at 16 near the top of a packet extraction column, extractant being introduced near the bottom at point 17. In the flowsheet it is assumed that the extractant has a lower specific gravity than the dinitrile solvent and therefore the extract of the dissolved material leaves the top of the column at point 18 and is introduced into a distillation column at point 19 provided with a heating coil 20. It is assumed that the extractant has a lower boiling point than the material extracted, therefore it is vaporized in the column, condensed in the condenser 21, a portion being refluxed in the conventional manner as shown by the arrows. The extractant is recirculated to the extraction column at point 17 as described above. The dissolved material leaves the bottom of the distillation column.

The dinitrile solvent, mixed with some water, leaves the bottom of the extraction column through the pipe 10, going to heat exchanger 14, where it is cooled and then enters a decanter 18, separating into a water layer and a dinitrile layer. The former is decanted into a receiver 13, from which it is recycled to point 15 on the mixer 12 through the heat exchanger 14. The dinitrile solvent, containing a very small amount of water, is decanted into a receiver 9, from which it can be recycled to the original solvent separation process.

If the extractant is heavier than the dinitrile solvent, the connections to the extraction column are reversed, and if it has a higher boiling point than the material dissolved, the exit connections for A and E on the distillation column will be reversed.

*Example 1*

A solution of about 10% toluene in bis(2-cyanoethyl)amine is processed as shown in Fig. 1, using as an extractant a high-boiling paraffin hydrocarbon (10 to 12 carbon atoms), which does not form any material amount of azeotropes with toluene. The paraffin extracts the toluene in the extraction column and the toluene is boiled off in the distillation column. The temperature in the extraction column may be room temperature, or it may be slightly higher. Toluene is obtained practically free from paraffin, and the small amount of toluene leaving the bottom of the distillation column is recovered because the paraffin is recycled through the extraction column. The dicyanoethylamine contains negligible amounts of toluene which, however, are not lost, as the solvent may be recycled through the original solvent extraction process. If it is desired to remove the last traces of dinitrile solvent from the toluene-paraffin mixture, it may be washed out with a small amount of hot water from which the dicyanoethylamine can be recovered.

*Example 2*

The procedure of Example 1 is followed, but instead of a solution of toluene in bis-cyanoethylamine, a solution of naphthalene is treated.

In this case the paraffin hydrocarbon is n-heptane, or a paraffin hydrocarbon mixture of similar boiling point. The connections from the distillation column are, of course, reversed, the heptane distilling off and, after being condensed, returned to the extraction column; whereas the naphthalene leaves the bottom of the distillation column in molten form.

Example 3

The process of Fig. 2 is carried out, using a solution of about 10% naphthalene in bis(2-cyanoethyl) ether. This is pre-heated to about 75° C. and mixed with an equal part of water from the receiver 13, which has also been pre-heated, and which contains a percent or so of the dicyanoethylether. The mixture then flows down through the extraction column counter-current to an up-flowing stream of n-heptane. The extract stream leaving the top of the extraction column contains from 0.1 to 0.2% of dicyanoethylether which, if desired, may be removed by washing with a small amount of hot water. The n-heptane distills off from the naphthalene in the distillation column, which leaves almost pure naphthalene. The solvent-water mixture leaving the bottom of the extraction column is substantially free from naphthalene and, on cooling, separates into a solvent-rich layer and a water-rich layer which are separated by decantation, the former being useful for solvent separation of a fresh petroleum fraction containing naphthalene, and the water-rich layer, after preheating, being recycled to the mixer.

Example 4

A mixture of 1 part paraffin naphtha, 1 part of water and 1 part of bis(2-cyanoethyl) sulfide containing 10% naphthalene was heated to 75° C. and thoroughly mixed. The two layers were then separated and analyzed. The paraffin layer contained 8.6% naphthalene and 0.1% solvent. The water-solvent layer contained 1.0% naphthalene.

The water-solvent layer separated on cooling to give a solvent-rich layer which is recycled in the original extraction process. The water-rich layer is recycled in the solvent recovery operation.

The paraffin layer containing the aromatic can be washed with small amounts of hot water to recover the last traces of solvent.

This example gives the results of a one-stage operation. The number of stages may be increased to give any desired low concentration of aromatics in the solvent to be recycled in the original extraction operation.

Example 5

A mixture of 1 part of n-heptane and 1 part of bis(2-cyanoethyl) ether, containing about 10% naphthalene, was thoroughly mixed at room temperature. After separation, the paraffin layer contained 6.5% naphthalene, and the solvent layer cotnained 3.8% naphthalene. The paraffin-aromatic layer contained 0.1% solvent. Washing the paraffin-aromatic layer with two 5% portions of hot water reduced the solvent content to 0.025%.

Example 6

The procedure of Example 3 is followed but instead of a solution of naphthalene in bis(2-cyanoethyl) amine, a 6% solution of dodecyl phenol in the same solvent is used. A satisfactory separation is obtained. It should be noted that even when equal weights of heptane and solvent are contacted, the solubility of the dodecyl phenol is actually somewhat greater in the heptane; namely, about 77%. This permits a rapid and efficient separation in the continuous process referred to above.

Example 7

The procedure of Example 3 is carried out, using a 10% solution of 2,4-lutidine instead of the naphthalene solution. A satisfactory removal of the lutidine is obtained, but a somewhat slower cycle is required as the solubility of the lutidine in the paraffin is less than in the case of the dodecyl phenol of the preceding example.

Example 8

The procedure of Example 3 is followed with an 8% solution of tetralin in the solvent. A very sharp separation with a short cycle is obtained as 90% of the tetralin will dissolve in the paraffin when equal amounts are used.

Example 9

The procedure of Example 3 is followed using a 10% solution of heptaldehyde in the solvent and employing methylcyclohexane as the extractant. The cycle is substantially the same as in Example 6 as the solubility of the heptaldehyde in the extractant is of the same magnitude.

Example 10

The procedure of Example 9 is followed using a solution of methylhexyl ketone in the solvent. The cycle is substantially the same, as the solubility characteristics of the two solutes are very similar.

Example 11

The procedure of Example 9 is followed using a 4% solution of pelargonic acid. A very short cycle is possible as, with equal weights of solvent and extractant, 93% of the pelargonic acid is extracted.

Example 12

The procedure of Example 9 is followed using a 10% solution of butyl acetate in the solvent. A slightly longer cycle is required as the solubility of the ester is about 10% that of the aldehyde of Example 9.

Example 13

The procedure of Example 3 is followed using a 10% solution of styrene in the solvent. A good separation is obtained.

Example 14

The procedure of Example 3 is followed employing mixed amyl chlorides as the extractant. The separation is effected with substantially the same sharpness.

Example 15

The procedure of Example 3 is followed using amyl ether as the extractant. The results obtained are substantially the same.

Example 16

The procedure of Example 3 is followed using lauryl alcohol as the extractant. A satisfactory separation is obtainable but a larger ratio of lauryl alcohol to solvent and a longer cycle are necessary because only 57% of the naphthalene dissolves in the lauryl alcohol phase when it is present in equal weight to the solvent.

Example 17

The procedure of Example 3 is followed but a solution of 10% of naphthalene in bis(N-cyano)-N-methylamine takes the place of the dicyanoalkylether. The extractant is a mixture of 1 part of n-heptane with 2 parts of water. A sharp separation is effected.

Example 18

The procedure of Example 3 is followed using a solution of 10–12% naphthalene in alpha,beta'-dicyanodiethylether. An extremely sharp separation is obtained.

Example 19

The procedure of Example 3 is followed with a 5–8% naphthalene solution in bis(cyanomethyl)-sulfide. The temperatures are higher as the solvent freezes at about 48° C. The extraction of naphthalene by the heptane is almost quantitative.

Example 20

The procedure of Example 19 is followed, except that the solvent is bis(alpha-cyanopropyl)-sulfide. As this solvent does not freeze at higher temperatures, the cold separation can be at room temperature. A very thorough extraction of naphthalene is obtained.

We claim:

1. A process of recovering dinitrile solvents selected from the group consisting of bis(lower cyanoalkyl)amines, bis(lower cyanoalkyl)ethers, bis(lower cyanoalkyl)sulfides, from solutions therein of materials having negligible water solubility, which comprises contacting the said solutions with an inert, substantially water-insoluble, extractant for the dissolved material, said extractant having saturated hydrocarbon groups as its major constituents and having the solvent characteristics of a saturated hydrocarbon, and which has a boiling point far removed from that of the dissolved material and does not form substantial quantities of azeotropes therewith, separating the so extracted dinitrile solvent from the extractant containing the dissolved material extracted thereby and separating the dissolved material from the extractant by fractional distillation.

2. A process according to claim 1 in which the dinitrile solvent is a bis(lower cyanoalkyl)-amine.

3. A continuous process according to claim 2 in which the extractant is contacted countercurrent with the solution of the dissolved material in the dicyanoalkylamine.

4. A process according to claim 3 in which the extractant is a paraffin hydrocarbon.

5. A process according to claim 4 in which the dissolved material is an aromatic hydrocarbon.

6. A process according to claim 1 in which the dinitrile solvent is a bis(lower cyanoalkyl)ether.

7. A continuous process according to claim 6 in which the extractant is contacted countercurrent with the solution of the dissolved material in the dicyanoalkylether.

8. A process according to claim 7 in which water is added to the dicyanoalkylether to reduce its solvent powers for the dissolved material, the extraction is carried out at temperatures between 70 and 100° C., and the dicyanoalkylether is separated from the water by cooling and decantation.

9. A process according to claim 8 in which the extractant is a paraffin hydrocarbon.

10. A process according to claim 9 in which the dissolved material is an aromatic hydrocarbon.

11. A process according to claim 1 in which the dinitrile solvent is a bis(lower cyanoalkyl)-sulfide.

12. A continuous process according to claim 11 in which the extractant is contacted countercurrent with the solution of the dissolved material in the dicyanoalkylsulfide.

13. A process according to claim 12 in which water is added to the dicyanoalkylsulfide to reduce its solvent powers from the dissolved material, the extraction is carried out at temperatures between 70 and 100° C., and the dicyanoalkylsulfide is separated from the water by cooling and decantation.

14. A process according to claim 13 in which the extractant is a paraffin hydrocarbon.

15. A process according to claim 14 in which the dissolved material is an aromatic hydrocarbon.

16. A process according to claim 3 in which the bis(cyanoalkyl)amine is bis(2-cyanoethyl)-amine.

17. A process according to claim 7 in which the bis(cyanoalkyl)ether is bis(2-cyanoethyl)-ether.

18. A process according to claim 11 in which the bis(cyanoalkyl)sulfide is bis(2-cyanoethyl)-sulfide.

GERARD N. VRIENS.
WILLIAM E. SISCO.
EUGENE C. MEDCALF.

REFERENCES CITED

The following references are of record in the file of this patent:

UNITED STATES PATENTS

| Number | Name | Date |
| --- | --- | --- |
| 2,439,534 | Wilkes | Apr. 13, 1948 |